L. P. PATTERSON.
MILKING MACHINE.
APPLICATION FILED JULY 20, 1914.
1,139,571.
Patented May 18, 1915.
3 SHEETS—SHEET 1.
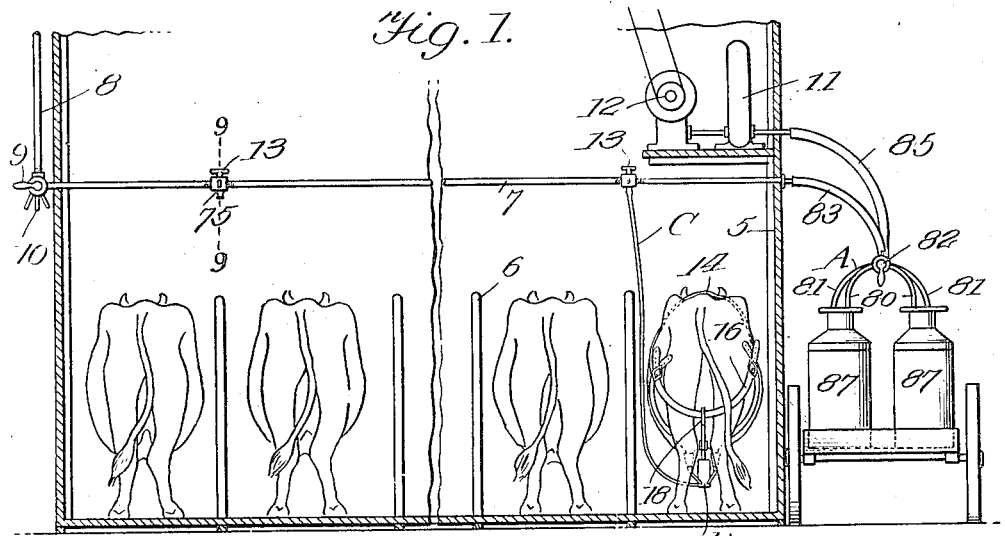
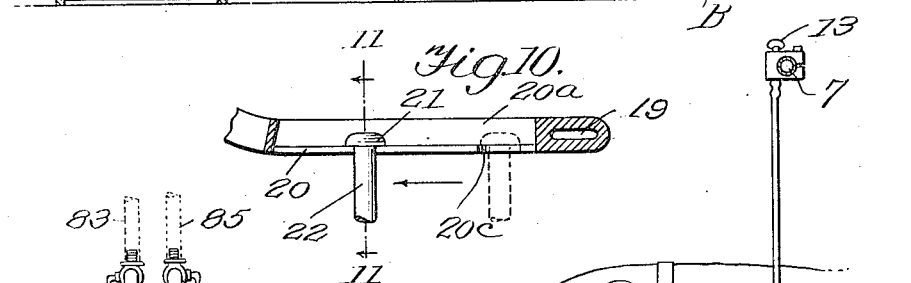
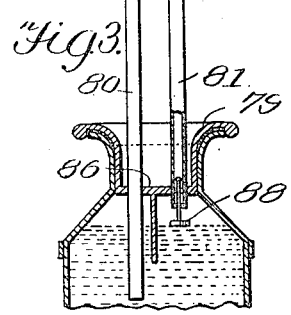
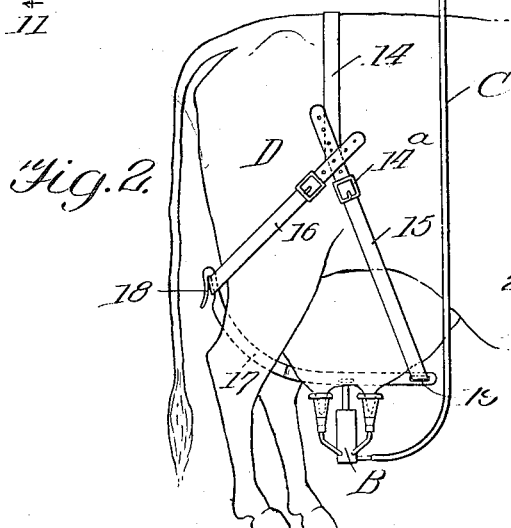
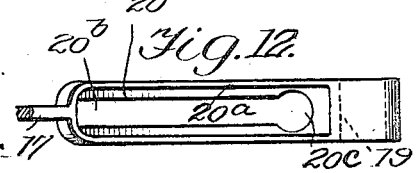
WITNESSES
N. E. Wade
Alan F. Garner
INVENTOR
LEWIS P. PATTERSON
BY Munn & Co.
ATTORNEYS

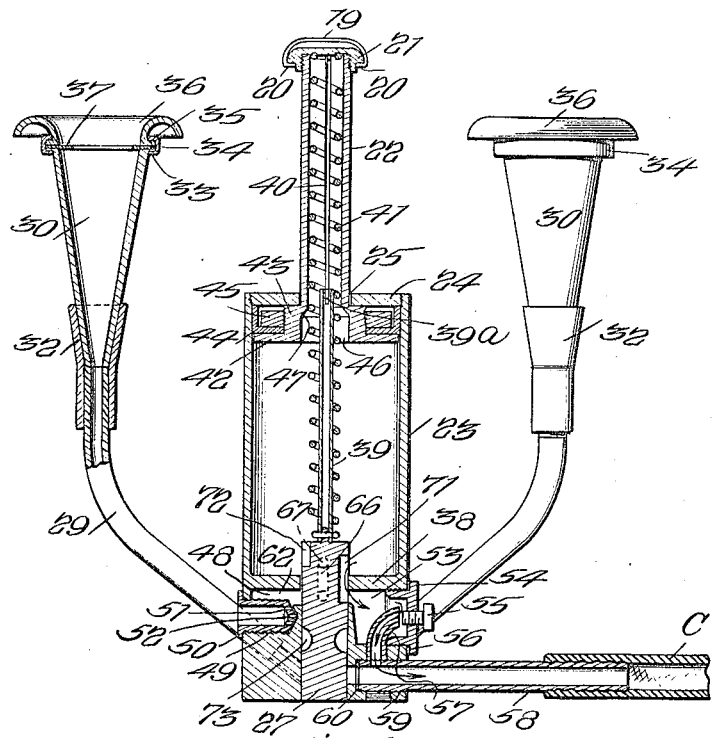
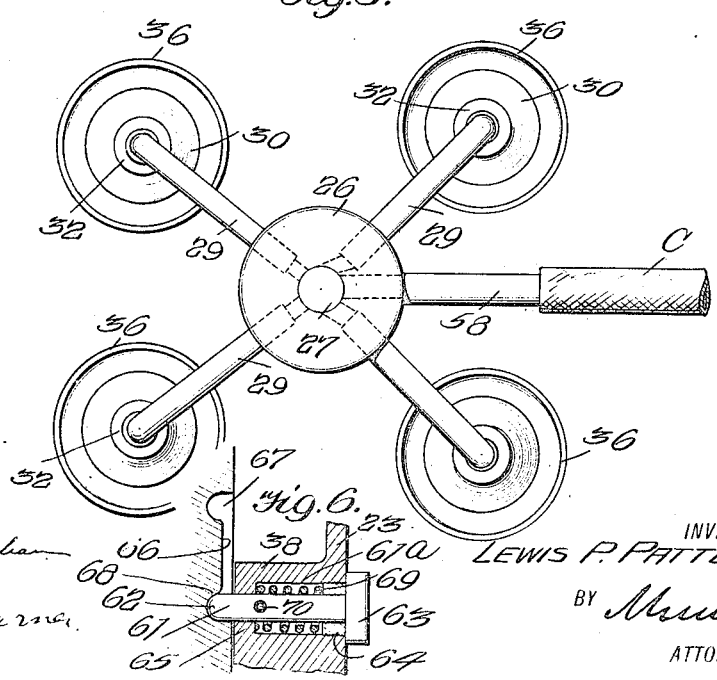

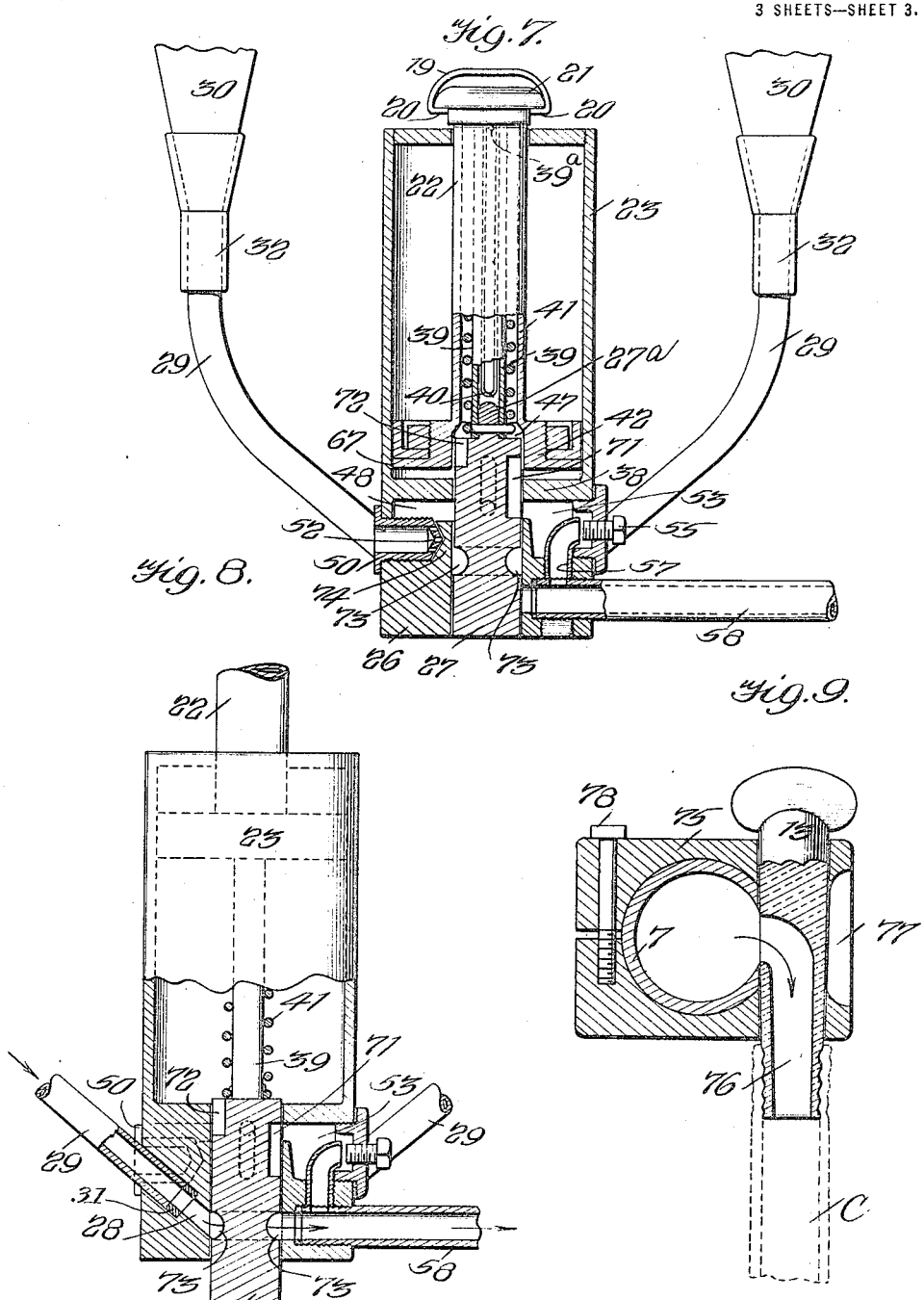

UNITED STATES PATENT OFFICE.

LEWIS PRESTON PATTERSON, OF SPRINGFIELD, MISSOURI, ASSIGNOR OF ONE-FOURTH TO NANCY C. PATTERSON, ONE-FOURTH TO EVA E. COOVER, AND ONE-FOURTH TO THOMAS W. GAROUTTE, ALL OF SPRINGFIELD, MISSOURI, AND ONE-FOURTH TO WILLIAM B. GAROUTTE, OF CARTHAGE, MISSOURI.

MILKING-MACHINE.

1,139,571.      Specification of Letters Patent.      Patented May 18, 1915.

Application filed July 20, 1914. Serial No. 851,936.

*To all whom it may concern:*

Be it known that I, LEWIS PRESTON PATTERSON, a citizen of the United States, residing at Springfield, in the county of Greene and State of Missouri, have invented a new and useful Improvement in Milking-Machines, of which the following is a specification.

This invention relates to automatic milking systems.

It is well known that milking by vacuum and cups has been successfully done for years, but without exception all the machines in present use with which I am acquainted require to be watched for fear of their falling off or being kicked off of the cows; require a manual pulling up and down on the cups during a portion of the milking period; require the manipulation of the udder by hand; require the carrying of the milk out in buckets and require the moving of a bundlesome load including cups, buckets, lid arrangements, etc., from cow to cow during the process of milking a herd.

It is the primary object of my invention to provide a milking system which will overcome these objections, by providing a sure on, self kneading apparatus of such a character that one man will be sufficient to operate a comparatively large number of them, means being provided for the quick and sure attachment and detachment of the machine, whereby a material saving in time may be accomplished.

A disadvantage accruing to the machines above referred to, is the fact that one man can only operate a comparatively small number of them.

Another object of the invention is to provide a system for automatically milking a number of cows and delivering the milk to containers ready for shipment.

Another object of the invention is to provide in a milking machine a pneumatically operable pulsator carrying teat cups and including means for providing an intermittent direct cut-off to the cups, whereby to periodically relax the teats.

A further object of the invention is to provide means for supporting the combined pulsator and kneading device in operable position.

Still another object of the invention is to provide means for automatically filling the milk cans by suction, and means for cutting off the suction when the cans are full.

A still further object of the invention is to provide a system including a delivery pipe, having means for connecting individual pulsators with the pipe at will, and further having means for cleaning the pulsators and delivery pipe.

With these and other objects in view, which will become apparent as the description proceeds, the invention resides in the construction, combination and arrangement of parts hereinafter more fully described and claimed, and illustrated in the accompanying drawings in which like characters of reference indicate like parts throughout the several figures, of which—

Figure 1 represents an elevational view illustrating the system in operation. Fig. 2 represents a side elevational view of the pulsator or milking machine illustrating the manner of attachment to a cow. Fig. 3 represents a vertical, sectional view taken through a milk can indicating the delivery device in operation. Fig. 4 represents a vertical sectional view taken through the pulsator showing the position of the parts at the beginning of the upward stroke of the pulsator. Fig. 5 represents a bottom plan view of the pulsator showing the position and arrangement of the cups. Fig. 6 represents a fragmentary vertical sectional view through one wall of the pulsator showing the position and operation of the valve clutch. Fig. 7 represents a view similar to Fig. 4 showing the position of the parts immediately before the termination of the upward stroke of the pulsator. Fig. 8 represents a fragmentary sectional view taken through the pulsator showing the position of the parts immediately before the termination of the downward stroke of the pulsator, and Fig. 9 represents an enlarged transverse sectional view taken on the plane indicated by the line 9—9 of Fig. 1. Fig. 10 represents a vertical longitudinal sectional view taken through the forward end of the reach or rod. Fig. 11 represents a vertical transverse sectional view taken on the plane indicated by the line 11—11 of Fig. 10. Fig. 12 represents a top plan view of a portion of the supporting rod shown in Fig. 10.

Referring more particularly to the drawing, the system may be installed in a barn in the manner indicated in Fig. 1, 5 representing the barn, provided with stalls 6, in which the cows are adapted to stand during the milking process, the system including a delivery pipe 7, connected at one end with an air inlet pipe 8 controlled by a valve 9, which valve also controls the connection of a cluster of pipe sections 10 with pipe 7, said pipe being connected through the medium of a delivery device A with a suction fan 11 driven by any suitable means indicated at 12. The pulsators or milking machines are indicated generally at B, and are connected with the delivery pipe 7 by tubes C detachably secured to the delivery pipe through the medium of cut-off valves or cocks 13.

A pulsator is provided for each cow and is supported in operable position by the supporting means indicated generally at D. The means includes a strap 14 adapted to span the cow's back and provided with buckles 14ª at its ends. Adjustably carried through the buckles are the front and rear supporting straps 15 and 16, respectively. A reach or rod 17 is provided, and is bent upwardly at its rear end and provided with a hook 18 for engaging over the strap 16 in the manner shown. The front portion of the reach is adapted to be positioned under the udder of the animal, and is provided with an opening 19 through which strap 15 is passed. The reach or rod in its forward portion is provided with spaced flanges 20 formed on arms 20ª provided by a bifurcation of the rod, and between arms 20ª occurs a slot 20ᵇ provided at one end with an enlargement 20ᶜ. A piston stem cap 21 threaded onto the upper end of the hollow piston stem of the pulsator is adapted as indicated in Fig. 10, to be inserted through the enlargement 20ᶜ into engagement with flanges 20 whereby the pulsator may be adjustably positioned beneath the udder of the animal.

The pulsator includes a cylinder 23 closed at its upper end by a head 24 threaded into the cylinder and provided with a central opening 25 through which the hollow piston stem 22 extends, the lower end of the cylinder being thickened as at 26, and being provided with a central opening, in axial alinement with the cylinder, in which is positioned a valve 27. The lower end of the cylinder is provided with four radially disposed upwardly inclined openings 28 which communicate at their lower ends with the central opening in which the valve is positioned, and which are enlarged at their upper ends for receiving the lower ends of the tubes 29, to the upper ends of which are secured the teat cups 30. The tubes are preferably made of malleable metal, and at their lower ends are seated against suitable washers 31 positioned against the shoulders occurring at the lower ends of the enlarged upper portions of openings 28, said tubes 29 being connected by stiff rubber hose joints or sleeves 32 with the lower ends of the funnel-shaped teat cups 30. The upper ends of the cups are flanged as at 33 and are connected by means of ring clips 34 with the flanges 35 provided on the flaring rubber rings 36, a rubber washer 37 being carried by each cup and being positioned between the cup and rubber ring in a manner indicated in Fig. 4.

Detachably connected with the upper end of valve 27, which valve projects through the floor 38 of the cylinder, is the lower end of a hollow valve stem 39 disposed axially of the cylinder and piston stem, said valve stem carrying a cross pin 39ª at its upper end over which rides a U-shaped wire 40 secured at its upper end to the cap 21 of the piston stem, and projecting at its lower end within the valve stem, said valve stem being of a smaller diameter than the piston stem and adapted to move into and out of the same as the cylinder moves up and down. A coiled spring 41 is secured at one end to the piston stem cap 21, and at the other end to the valve 27 at the lower end of the valve stem 39, said spring surrounding the valve stem and extending within the piston stem, and being in a normal state of tension when the cylinder is substantially intermediate the limits of its movement.

The lower end of spring 41 extends through an opening provided in the lower end of valve stem 39, and into an opening provided in the lug 27ª formed on the upper end of valve 27. In this manner the spring and valve stem are detachably connected to said valve.

The piston 42 may be formed integrally with stem 22, and is connected by an externally threaded hollow shank 43, over which is positioned a suitable washer 44 held in position against the rear face of the piston by a suitable internally threaded ring 45, said shank being internally of a greater diameter than the inside diameter of stem 22 and being of such a size at 46 to accommodate the upper end of the valve 27 at the termination of the upward stroke of the cylinder, and providing an inclined shoulder 47 against which the valve 27 is adapted to strike immediately preceding the upper terminal of the cylinder movement.

Below the cylinder floor 38 on one side thereof, is provided an air inlet 48 communicating with an opening 49, in which a hollow screw 50 is threaded, said screw having a conical inner end 51 provided with openings 52 through which air may pass from the outside into the air intake port 48.

Diametrically opposed to the intake port 48 is the exhaust port 53 closed at its outer end by a bushing 54 carrying a set screw 55, said bushing being turned into engagement with a suitable washer 56 to provide an air tight joint, the exhaust port connecting by means of a curved tube 57 with a nipple 58 threaded into an opening 59 below the exhaust port and seating against a washer 60, said nipple serving as a means of communication between the pulsator and delivery tube C.

Provided in the lower enlarged end 26 of the cylinder at a point in the periphery thereof intermediate the inlet and exhaust ports and immediately below the floor 38 of the cylinder, is a bore 61ª extending nearly to the opening in which the valve 27 is positioned, in which bore is disposed a clutch including a stem 61 having a rounded inner end 62, and provided with an enlarged head 63, said stem slidably extending through bushing 64 threaded in the outer end of bore 61ª, and extending at its inner end through the floor 65 of the bore in position to engage the longitudinal groove 66 provided in valve 27 and terminating at its upper and lower ends in depressions 67 and 68 respectively, said clutch being normally maintained in engagement with the valve by means of a coiled spring 69, bearing at one end against the bushing 64 and at its other end engaging in an opening 70 provided in the clutch stem. A groove 71 provided in the valve 27 serves when the valve is in a certain position, as a communication between the interior of the cylinder and the exhaust port 53, and a recess 72 diametrically disposed with relation to groove 71 and cut in the upper end of the valve, serves when said valve is in a certain other position as a communication between the inlet port 48 and the interior of the cylinder. An annular channel 73 provided in the valve nearer the lower end thereof serves as a communicating means between the tubes 29 and the nipple 58 when the valve is in a certain position relative to the cylinder, to allow exit of the milk from the teat cups to the delivery tube C.

When the pulsators have been positioned on the cows, the delivery tubes C connected to the stop cocks 13, the fan or pump 11 started up, and the stop cocks 13 turned into the position indicated in Fig. 9, a suction will be created through the pulsators and through the delivery tubes C, the fan being connected with the delivery pipe 7 through the apparatus A which will be hereinafter described, and the teats having been started into the cups 30, the action will be as follows:

The parts being in the position shown in Fig. 4, a suction created in the tube C will result in the exhaust of the air from within the cylinder 23 through the groove 71 in the direction indicated by the arrow, through the exhaust chamber 53, through the curved pipe 57 and into the nipple 58, exhausting the air in the cylinder and causing the cylinder to rise carrying with it the teat cups and the valve 27, since the clutch 61 will be engaged in the lower depression 68 when the valve is in the position shown in Fig. 4, and as the cylinder rises it compresses spring 41, within the piston stem 22, and just before the cylinder reaches the upper terminal of its movement, the upper end of valve 27 will strike against the shoulder 47 as indicated in Fig. 7, thus arresting the movement of valve 27 and allowing a slight movement of the cylinder upwardly relative to said valve, and hence disengaging the clutch 61 from the valve, and this movement will allow the spring 21 to move the valve downwardly relative to the cylinder until the clutch engages in the upper depression 67, and when the valve is in this position, the recess 72 will be in communication with the interior of the cylinder and with the inlet port 48, and the upper end of groove 71 will be below, and hence closed by the floor 38 of the cylinder, and at the same time the annular channel 73 will be in communication with the tubes 29, leading from the teat cups, and with the nipple 58, and hence the suction will be cut off from the cylinder and will be transferred to the teat cups, thus drawing the milk from them during the downward movement of the cylinder caused by the expansion of spring 41, the inlet of air to the cylinder, and the weight of the cylinder and parts supported by it, the position of the parts during this downward movement being indicated in Fig. 8.

The tension of spring 41 relaxes as the cylinder nears the lower end of its movement, and at this point the lower movement of the valve stem 39 relative to the wire 40 engages pin 39ª against the lower end of the wire 40, thus allowing a slight movement of the cylinder downwardly relative to the valve 27, and the spring at this time having passed beyond its normal position and having been stretched, draws the valve upwardly until the clutch engages in the lower depression 68, thus cutting off communication between the teat cups and delivery tube and also establishing communication between the cylinder and delivery tube through the exhaust port, and cutting off the communication between the inlet port and the cylinder, the parts being in this position as indicated in Fig. 4, and the operation is proceeded with in the manner described.

By adjusting the hollow screw 50 relative to the seat 74 which is hollowed to fit the cone-shaped inner end of the screw, it is evident that a more or less amount of air will be afforded to the interior of the cylinder as the latter moves downwardly, and hence the speed of the downward movement of the cylinder, and hence the length of time that the suction is supplied to the teats may be regulated, and by adjusting set screw 55 relative to the upper end of the curved tube 57, the upward movement of the cylinder may be suitably timed.

By the operation described, it is apparent that suction is imparted to the teats during the downward pull of the cups, and that during the upward knead of the latter the suction is entirely cut off and thorough relaxation imparted to the teats, thus imitating the process of calf and hand milking.

The stop cocks 13 as indicated in Fig. 9 are made of glass, and are carried by the clamps 75 and are bored as at 76 to communicate at one end with the delivery tubes C and at the other end through openings in pipe 7 with the interior of said pipe, the clamps being recessed as at 77 whereby the stop cocks may be viewed by the operator to determine the flow of the milk. By means of the set screws 78 the split rear end of each clamp may be tightened for securing the clamp in place on the pipe.

The delivery device A includes a pair of can closures 79 each carrying one end of the U-shaped pipes 80 and 81 respectively, the pipe 80 connecting through the aid of the two-way valve 82 with a tube 83 communicating with the delivery pipe 7, the U-shaped pipe 81 communicating through the aid of a similar two-way valve 84 with a tube 85 communicating with the fan or pump 11. The ends of the pipe 80 extend through the floors 86 of the can closures 79 which closures may be positioned in a pair of milk cans 87 carried by a delivery wagon on the outside of the barn as indicated in Fig. 1, and the ends of the pipe 81 also extend through the floors of the can closures and are provided with float valves 88. The closures having been placed on the cans and the pump started up, the suction through the pipe 81 and tube 85 exhausts the air within the cans and the milk is thus drawn in the manner set forth, into the delivery pipe 7 and through the tube 83 and pipe 80 into the cans, and the valve 82 is set so that one can will receive a greater amount of milk than the other, and hence will fill more rapidly than the other and the milk having attained a certain height in that can will raise the float valve 88 until it cuts off the suction to the pipe 81, hence stopping the flow of milk into the can. The flow to the full can is then cut off at the valve 82 and the closure lifted, this action being possible since the tubes 83 and 85 are flexible, the filling action in the meantime going on in the other can, and the full can is then removed and an empty one put in its place, and closed, and the two-way valve is then turned in favor of the empty can.

The milking operation having been completed, the stop cocks 13 may be turned off and the pulsators removed from the animals, and the tubes C detached from the stop cocks, and the tubes may then be connected to the cluster 10 and the pulsators be placed in water, empty cans being connected to the delivery apparatus A, so that the system including the pulsators, tube, and delivery apparatus may be thoroughly cleaned with a minimum amount of work and time, and when not in use the system may be thrown into communication with the outside atmosphere through the medium of the valve 9, said valve adapted to control the connection of the air tube 8 with the pipe 7, and also the connection of cluster 10 with said pipe.

Athough I have described the preferred embodiment of my invention, I may desire to make such changes in the construction, combination and arrangement of parts as do not depart from the spirit of the invention and the scope of the appended claims.

I claim:

1. A milking system including a plurality of receptacles, a plurality of pulsators, a delivery pipe connected to the pulsators, an inverted U-shaped pipe connected to the end of the delivery pipe, said U-shaped pipe projecting at its ends within the receptacles, a second inverted U-shaped pipe projecting at its ends within the receptacles, means for placing the second U-shaped pipe under suction, and means for automatically cutting off the suction at each end of the second U-shaped pipe as the receptacles respectively become filled.

2. A system of the class described comprising a plurality of receptacles, means for creating a vacuum in the receptacles, means for filling the receptacles as the vacuum is created therein, said vacuum forming and receptacle filling means comprising can closures having a pair of substantially inverted U-shaped pipes extending each at its ends through the closures, and a tube connected with each of the U-shaped pipes and controlled by a two-way valve, said tubes being connected one to a source of supply and one to a suction pump, and cut off float valves associated with one of the tubes for automatically cutting off the suction in the receptacles when they become filled.

3. A system of the class described including a delivery mechanism, a plurality of receptacles for receiving milk connected with the delivery mechanism, means for creating a suction within the receptacles, a delivery pipe, connecting means between the delivery pipe and delivery mechanism, a plurality of pulsators, teat cups carried by said pulsators, connecting means between the pulsators and delivery pipe, a cluster of pipe sections connected with the delivery pipe, and an air vent tube connected with said pipe, and means for controlling the communication between the cluster and delivery pipe, and between the air tube and delivery pipe, substantially as described.

4. A milking system including means for creating a suction within milk receiving receptacles, and means for delivering milk to the receptacles, said suction creating and milk delivering means comprising a plurality of can closures, a plurality of pipes communicating at their ends with the receptacles through the closures, said pipes being carried by said closures, a delivery tube connected with one of the pipes, a valve for controlling the passage from said tube through the branches of its pipe, a suction tube connected with the other pipe, a valve for controlling the communication between the suction tube and its pipe, a float valve carried by each branch of the suction tube and adapted to close the communication to that branch upon the filling of the receptacle to which the branch is connected.

5. A system of the class described comprising a pulsator provided with teat cups, means for securing said pulsator, said means comprising a back strap adapted to span the back of an animal, said strap being provided with a pair of buckles at its ends, supporting straps adjustably carried by said buckles, said supporting straps extending one beneath and one behind the cow, a supporting rod having its rear end curved upwardly and provided with a hook adapted to engage one of the supporting straps, said rod at its opposite end provided with an opening through which the other supporting strap is adapted to engage, said rod provided with a slot therein having an enlargement at one end, and a cap carried by the pulsator and adapted to enter said enlargement to be moved into engagement with the rod on both sides of said slot.

6. A system of the class described including a pulsator, said pulsator comprising a cylinder, a piston positioned within the cylinder and provided with a hollow piston stem extending through one head of the cylinder, a cap connected to the outer end of the piston stem, a valve slidable in the opposite cylinder head, a clutch for normally maintaining the valve at one or the other end of its movement, a hollow valve stem connected to the valve and disposed to extend within the piston stem, a coiled spring connecting said valve and piston stem cap, said spring surrounding said valve stem, a U-shaped wire carried by the piston stem and extending within the valve stem, a pin over which said wire is adapted to travel, said pin carried by the valve stem, tubes carried by the cylinder communicating with the opening in which the valve is positioned, teat cups connected to the tubes, an air inlet and an exhaust port provided in the cylinder head adjacent the valve, said valve having a port leading from said exhaust port to create a suction within the cylinder when the valve is in one position, for raising said cylinder relative to the piston, said valve having a port leading from said inlet port to the cylinder when said valve is shifted, and said U-shaped wire being adapted to shift the valve when the cylinder is at the lower end of its movement for cutting off the inlet and reopening the exhaust means, substantially as described.

7. A system of the class described including a pulsator, said pulsator including a cylinder and a piston, said cylinder adapted to move upwardly and downwardly relative to the piston, means including a delivery tube under suction for creating a vacuum within the cylinder, for raising the latter relative to the piston, a valve for controlling the vacuum within the cylinder, said valve being movable relative to the cylinder, teat cups connected with said cylinder, said valve upon downward movement of the cylinder being adapted to afford communication between the teat cups and delivery tube, and to cut off the suction from the cylinder.

8. A system of the class described, including a pulsator, said pulsator comprising a stationary and a movable member, teat cups carried by the movable member, a delivery tube under suction connected with the movable member, a valve for controlling the communication between the teat cups and delivery tube, and means for operating said valve whereby to cut off the suction from the cups upon the upward knead of said cups, and to establish the suction between the cups and tube upon the downward pull of the former.

9. A system of the class described including a pulsator comprising a movable and a stationary member, means for raising and lowering said movable member relative to said stationary member, teat cups carried by the movable member, a delivery tube carried by said member, means for creating a suction through said tube, and means for creating communication between the tube and cups upon the downward movement of the latter, said means adapted to cut off the communication upon the upward movement of the cups.

10. A system of the class described including a pulsator, said pulsator comprising a piston, and a cylinder movable relatively to the piston, teat cups carried by the cylinder, said cylinder provided in one end with a central axial opening, a valve movable in said opening, said cups communicating with the central opening, a delivery tube connected to the cylinder and communicating with the central opening, said valve having an annular channel therein adapted to establish or cut off the communication between the cups and delivery tube as the valve is lowered or raised respectively, said valve being adapted for establishing communication between the cylinder and tube when the valve is raised, means for creating a suction through the tube, whereby to exhaust the air in the cylinder to raise the latter, means for shifting the valve at the upper end of the cylinder stroke for cutting off the communication with the tube and simultaneously establishing communication between the cups and tube, said cylinder and valve being adapted for establishing communication of the cylinder with the outside atmosphere when said valve is lowered, and means for lifting the valve at the lower end of the cylinder stroke.

11. A milking machine including a pulsator comprising a piston and a cylinder movable relatively thereto, a valve movable relatively to the cylinder, means for exhausting the air in the cylinder, when the valve is in one position and for cutting off the exhaust and allowing the entrance of air to the cylinder when the valve is in the opposite position, means for normally holding the valve in one position or the other, means for releasing the valve from the holding means at one end of the cylinder stroke, said means comprising a shoulder formed within the piston and adapted to co-operate with one end of the valve, means for shifting the valve in the opposite direction at the opposite end of the cylinder stroke, said means comprising a wire associated with the piston and a pin associated with the valve, substantially as described.

12. A milking machine including a pulsator, said pulsator comprising a piston, a cylinder movable relatively thereto, a valve carried by the cylinder, an intake and an exhaust port in said cylinder and controlled by the valve, a hollow screw threaded in the cylinder and provided with openings communicating with the intake port, said screw adapted to be adjusted for regulating speed of one stroke of the cylinder, a delivery tube connected with the cylinder, a curved pipe communicating with the delivery tube and with the exhaust port, and a set screw adapted to co-act with one end of the curved pipe for regulating the speed of the cylinder in the opposite direction.

13. A milking machine including a piston, a cylinder movable relatively thereto, a valve movable relatively to the cylinder, means for exhausting air in the cylinder when the valve is in one position and for cutting off the exhaust and allowing the entrance of air to the cylinder when the valve is in the opposite position, means for normally holding the valve in one position or the other, means for releasing the valve at one end of the cylinder stroke, means for moving the valve in one direction after its release, and means for shifting the valve in the opposite direction at the opposite end of the cylinder stroke.

14. A system of the class described including a pulsator, teat cups carried thereby, said teat cups each comprising a funnel-shaped body having an outwardly extending flange, an outwardly flared resilient member provided with a flange corresponding to the body flange, a resilient washer disposed between the body and resilient member, and a ring clip for connecting the body, resilient washer and resilient member.

15. A system of the class described including a pulsator, hollow tubes carried thereby, teat cups, adjustable means for connecting said cups to said tubes, said means comprising stiff resilient means adapted to engage over the adjacent ends of the cups and tubes.

16. A system of the class described including a delivery pipe, a pulsator, a tube connecting the pulsator and pipe, and means supported by the pipe for establishing communication between the tube and pipe, said means comprising a clamp carried by the pipe, a transparent valve carried by the clamp and provided with a bore adapted when the valve is in one position to communicate at one end with the pipe, said tube adapted to be connected to said valve, said clamp provided with a recess whereby the valve may be viewed.

17. A system of the class described including a stationary member, means for disposing the stationary member adjacent the udder of a cow, a movable member adapted to be automatically reciprocated relatively to the stationary member, teat cups carried by the movable member whereby to produce kneading of the udder, and means for creating a suction through the cups on the downward movement of said movable member and for cutting off the suction upon the upward movement thereof.

18. A system of the class described including a pulsator, said pulsator comprising a stationary and a movable member, valve controlled pneumatic means for raising and lowering the movable member relatively to the stationary member, teat cups carried by the movable member, and means for creating a suction through the cups on downward movement of the member, and for cutting off the suction upon upward movement.

19. A system of the class described including a stationary and a movable member, means for reciprocating the movable member relatively to the stationary member, means for regulating the speed of each stroke of the movable member, teat cups carried by the movable member, and means for creating a suction through the cups upon movement of the movable member in one direction and for cutting off the suction upon movement of said member in the opposite direction.

LEWIS PRESTON PATTERSON.

Witnesses:
  FRANK B. DAVIES,
  S. L. CRAIG.